(12) United States Patent
Wu

(10) Patent No.: US 8,251,592 B2
(45) Date of Patent: Aug. 28, 2012

(54) MALE OPTICAL CONNECTOR AND FEMALE OPTICAL CONNECTOR AND RELATED OPTICAL FIBER COUPLING ASSEMBLY

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 243 days.

(21) Appl. No.: 12/820,041

(22) Filed: Jun. 21, 2010

(65) Prior Publication Data

US 2011/0194818 A1  Aug. 11, 2011

(30) Foreign Application Priority Data

Feb. 8, 2010  (CN) .......................... 2010 1 0301385

(51) Int. Cl.
*G02B 6/38* (2006.01)
(52) U.S. Cl. ................. 385/74; 385/33; 385/73; 385/75
(58) Field of Classification Search ............... 385/73–75
See application file for complete search history.

(56) References Cited

U.S. PATENT DOCUMENTS

| | | | | |
|---|---|---|---|---|
| 4,304,461 A * | 12/1981 | Stewart et al. | ................... | 385/74 |
| 5,104,242 A * | 4/1992 | Ishikawa | ......................... | 385/53 |
| 5,241,612 A * | 8/1993 | Iwama | ............................. | 385/74 |
| 5,329,604 A * | 7/1994 | Baldwin et al. | ................. | 385/92 |
| 5,716,224 A * | 2/1998 | Masuda et al. | ................ | 439/138 |
| 6,461,054 B1 * | 10/2002 | Iwase | ............................... | 385/73 |
| 6,471,412 B1 * | 10/2002 | Belenkiy et al. | ................ | 385/53 |
| 6,655,850 B2 * | 12/2003 | Mann et al. | ..................... | 385/74 |
| 6,715,930 B2 * | 4/2004 | McBride | .......................... | 385/73 |
| 6,866,424 B2 * | 3/2005 | Tanaka et al. | ................... | 385/55 |
| 7,118,288 B2 * | 10/2006 | Lu | .................................... | 385/60 |
| 7,144,163 B2 * | 12/2006 | Tanaka et al. | ................... | 385/75 |
| 7,153,041 B2 * | 12/2006 | Mine et al. | ...................... | 385/92 |
| 7,309,259 B2 * | 12/2007 | Sun et al. | ....................... | 439/630 |
| 7,507,032 B2 * | 3/2009 | Katagiyama et al. | ........... | 385/73 |
| 2003/0147597 A1 * | 8/2003 | Duran | ............................ | 385/76 |
| 2003/0180005 A1 * | 9/2003 | McBride | ......................... | 385/73 |
| 2004/0052473 A1 * | 3/2004 | Seo et al. | ........................ | 385/73 |
| 2006/0153504 A1 * | 7/2006 | Suzuki et al. | ................... | 385/71 |
| 2010/0054665 A1 * | 3/2010 | Jones et al. | ..................... | 385/59 |
| 2010/0158448 A1 * | 6/2010 | Yi et al. | .......................... | 385/74 |
| 2011/0229094 A1 * | 9/2011 | Isenhour et al. | ................ | 385/92 |

* cited by examiner

*Primary Examiner* — Rhonda Peace
(74) *Attorney, Agent, or Firm* — Altis Law Group, Inc.

(57) ABSTRACT

An optical fiber coupling assembly includes a male optical connector and a female optical connector. The male optical connector includes an insulative base having a first surface, a second surface opposite to the first surface, and a male transmitting surface, first lenses mounted to the insulative base and exposed at the male transmitting surface, and a cover having an arm and a blocking plate. One end of the arm is fixed to the second surface, the other end of the arm resiliently attached to the blocking plate. The blocking plate is apart from the first lenses for covering the first lenses. The female optical connector faces the male transmitting surface. The female optical connector includes an insulative supporting member having a female transmitting surface facing the male transmitting surface, second lenses mounted to the female transmitting surface, and two spaced pushing members formed on the female transmitting surface.

17 Claims, 11 Drawing Sheets

MALE OPTICAL CONNECTOR AND FEMALE OPTICAL CONNECTOR AND RELATED OPTICAL FIBER COUPLING ASSEMBLY

BACKGROUND

1. Technical Field

The present disclosure relates to optical technology and, particularly, to a male optical connector, a female optical connector, and a related optical fiber coupling assembly.

2. Description of Related Art

Currently, an optical fiber coupling assembly is preferred for use in data transmission between electronic devices due to their high transmission speed and signal integrity. Generally, the optical fiber coupling assembly includes two optical fiber connectors, such as a male optical connector and a female optical connector, for coupling the optical fibers together to allow optical transmittance between the optical fibers. The connectors include lenses each being aligned with a corresponding optical fiber. When coupling connectors together, a lens in the male optical connector is aligned with a corresponding lens in the female optical connector to ensure the optical transmittance. However, when the connector is detached from the other connector, the lenses are easily contaminated. This decreases transmission efficiency and destroys the signal integrity.

Therefore, what is needed is to provide a male optical connector, a female optical connector, and a related optical fiber coupling assembly, which can overcome the above-mentioned problems.

DETAILED DESCRIPTION

Figure 1:
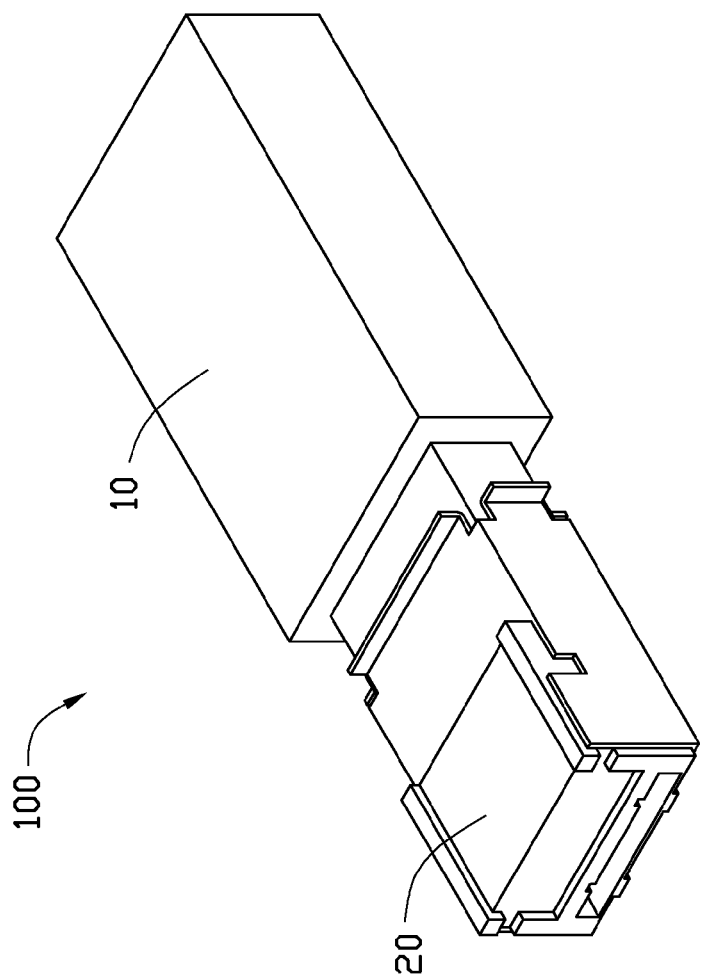
FIG. 1 is a schematic, isometric view of an optical fiber coupling assembly including a male optical connector and a female optical connector, according to a first exemplary embodiment, showing the optical fiber coupling assembly in a coupled stated.

Referring to FIG. 1, an optical fiber coupling assembly 100, according to a first exemplary embodiment, includes a male optical connector 10 and a female optical connector 20. For example, the female optical connector 20 may be assembled in electronic devices (not shown), such as printers, cameras, and computer hosts. The male optical connector 10 may be assembled to some portable electronic devices or computer peripherals and is coupled to the female optical connector 20 for transmitting optical signals.

Figure 2:
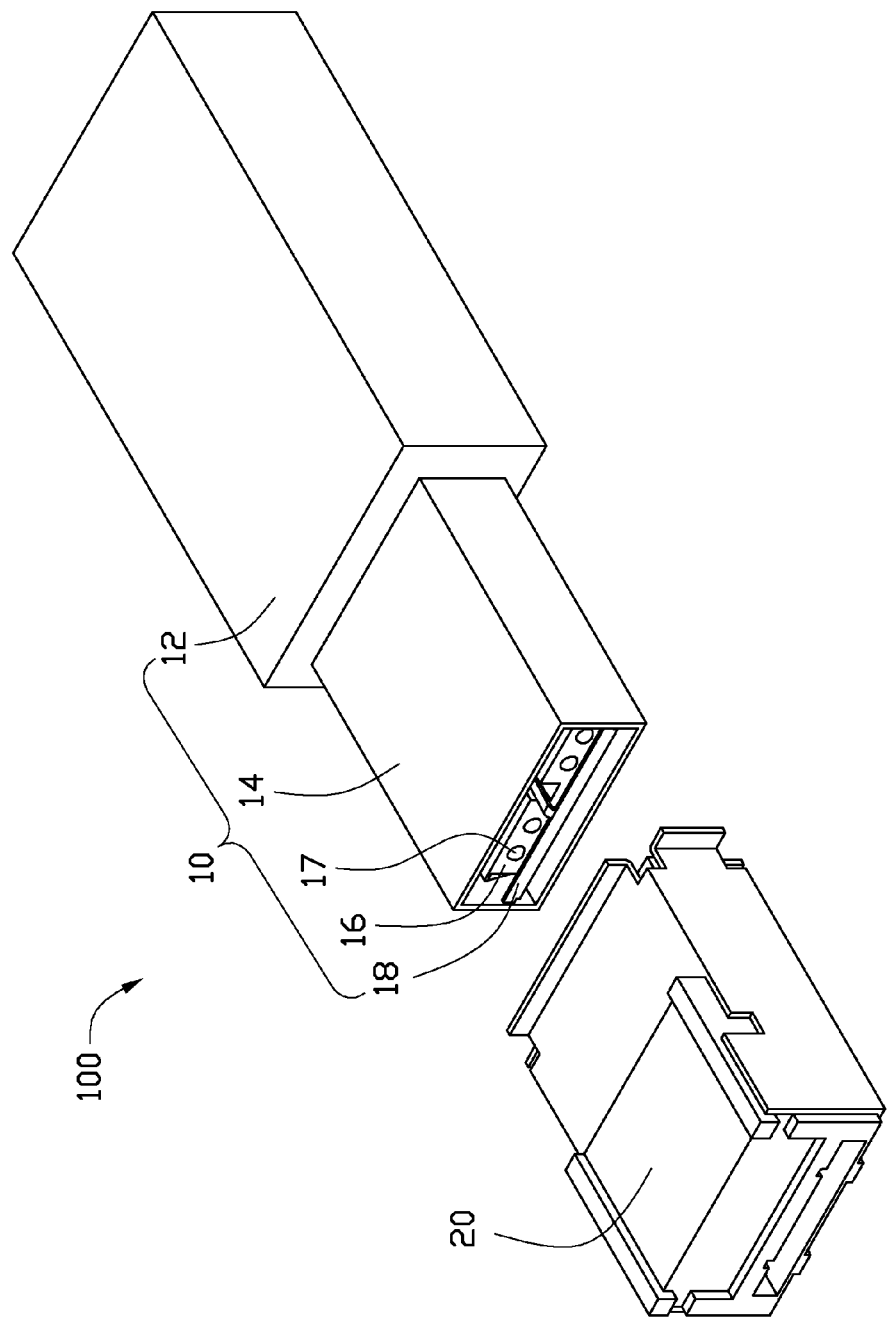
FIG. 2 is similar to FIG. 1, but showing the optical fiber coupling assembly in an uncoupled state.
Figure 3:
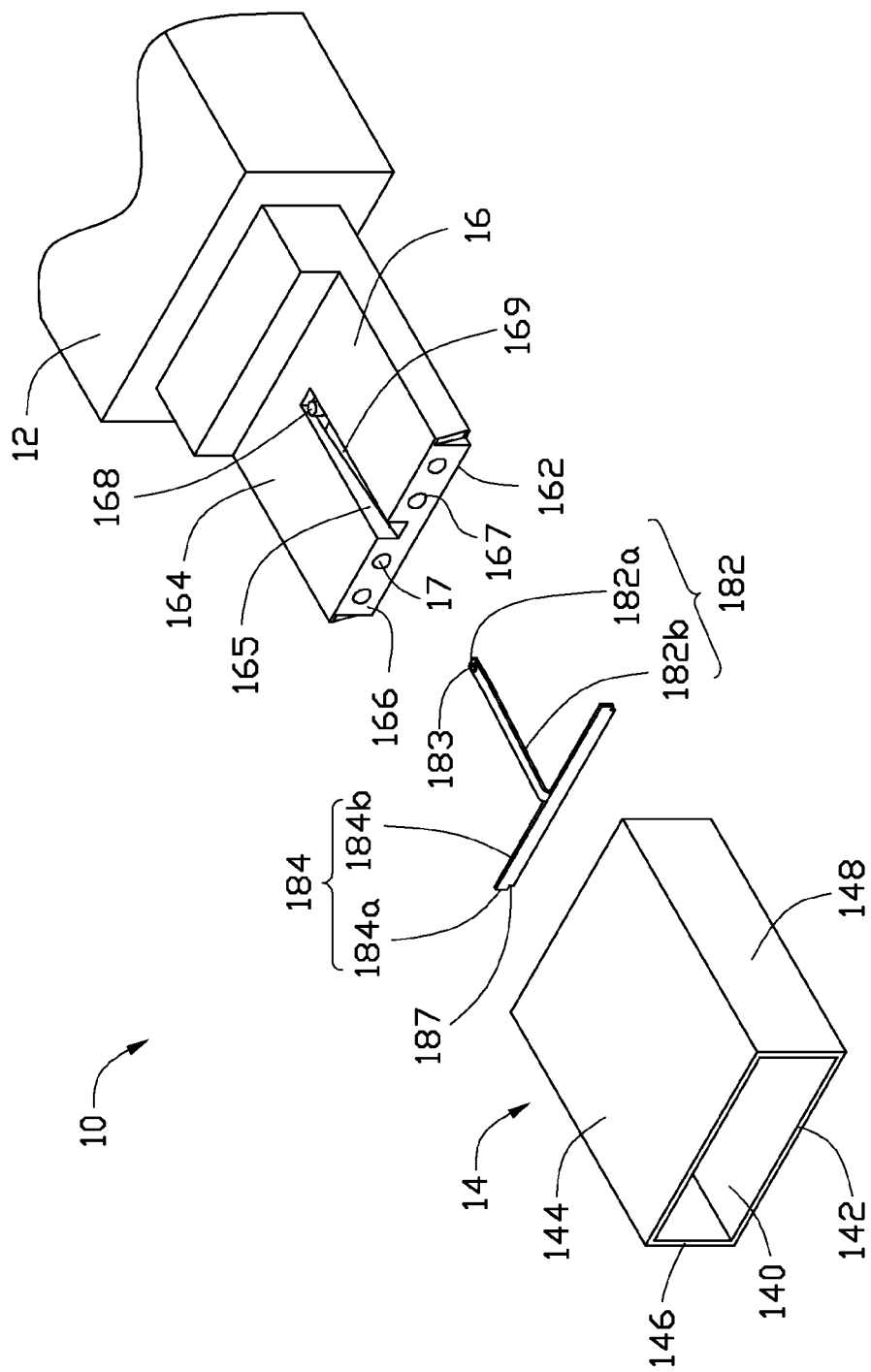
FIG. 3 is an exploded, isometric view of the male optical connector of FIG. 1.

Referring to FIGS. 2-3, the male optical connector 10 includes a grip 12, an inserting portion 14, an insulative base 16, four first lenses 17, and a cover 18.

The grip 12 is configured for being held by a user while the male optical connector 10 is coupled to the female optical connector 20.

The inserting portion 14 is a hollow substantially cuboid and defines a first cavity 140. The inserting portion 14 is attached to the grip 12 and includes a first sidewall 142, a second sidewall 146, a third sidewall 144, and a fourth sidewall 148. The first sidewall 142 is substantially parallel to the third sidewall 144. The second sidewall 146 is substantially parallel to the fourth sidewall 148. The first sidewall 142, the second sidewall 146, the third sidewall 144, and the fourth sidewall 148 are connected to each other substantially perpendicularity end-to-end.

The insulative base 16 is received in the first cavity 140. The insulative base 16 includes a first surface 162, a second surface 164, a male transmitting surface 166, and a positioning post 168. The first surface 162 and the second surface 164 are positioned at opposite sides of the insulative base 16, and the first surface 162 is in contact with the first sidewall 142. The second surface 164 faces the third sidewall 144. A slot 165 is defined in the middle of the second surface 164. The male transmitting surface 166 substantially perpendicularly connects the first surface 162 to the second surface 164. The male transmitting surface 166 faces the female optical connector 20. Four first receiving holes 167 are defined on the male transmitting surface 166. The positioning post 168 extends from a bottom surface 169 in the slot 165.

The four first lenses 17 are partially received in the four first receiving holes 167, respectively.

Figure 6:
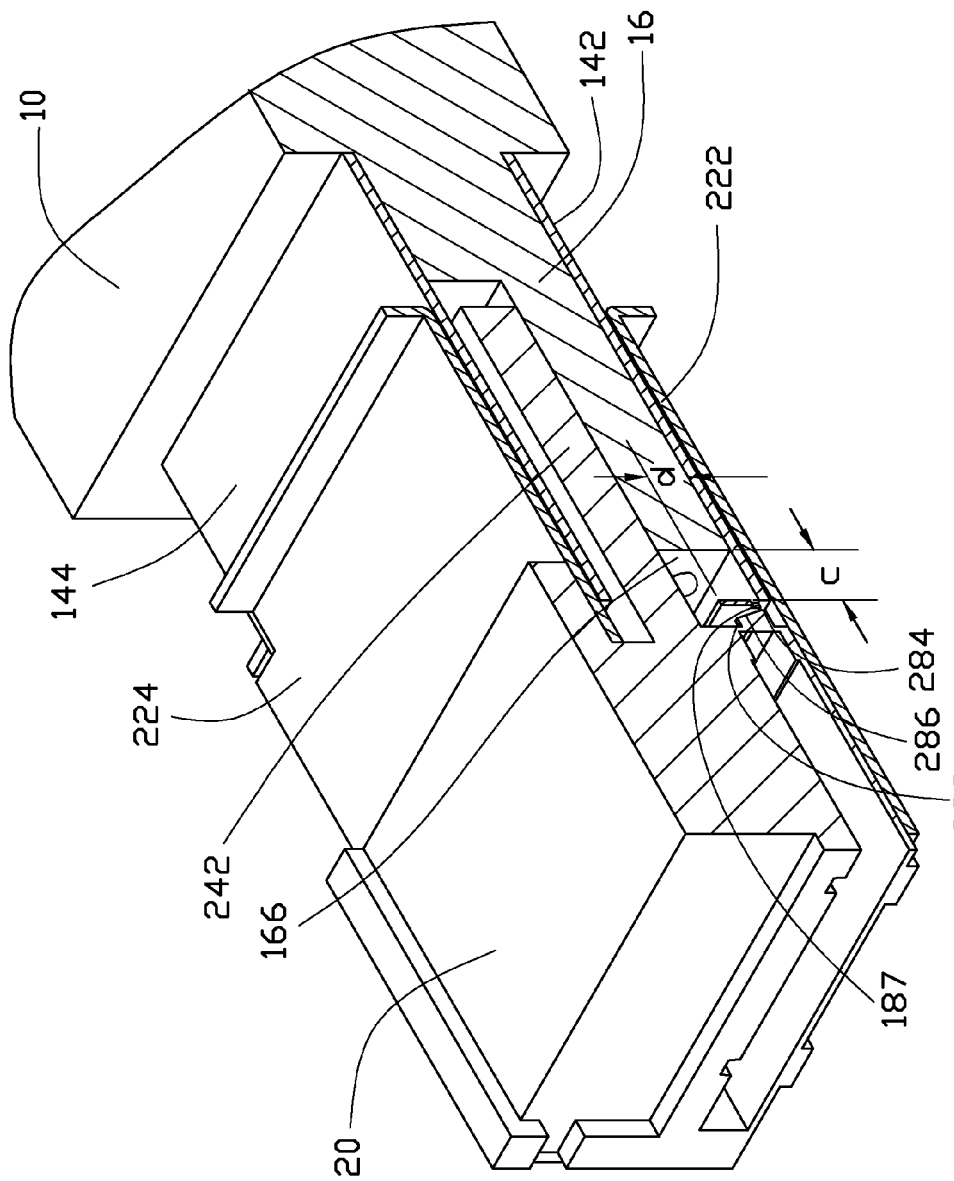
FIG. 6 is a sectional view of the optical fiber coupling assembly of FIG. 1, showing the male optical connector coupled to the female optical connector in a first position.
Figure 7:
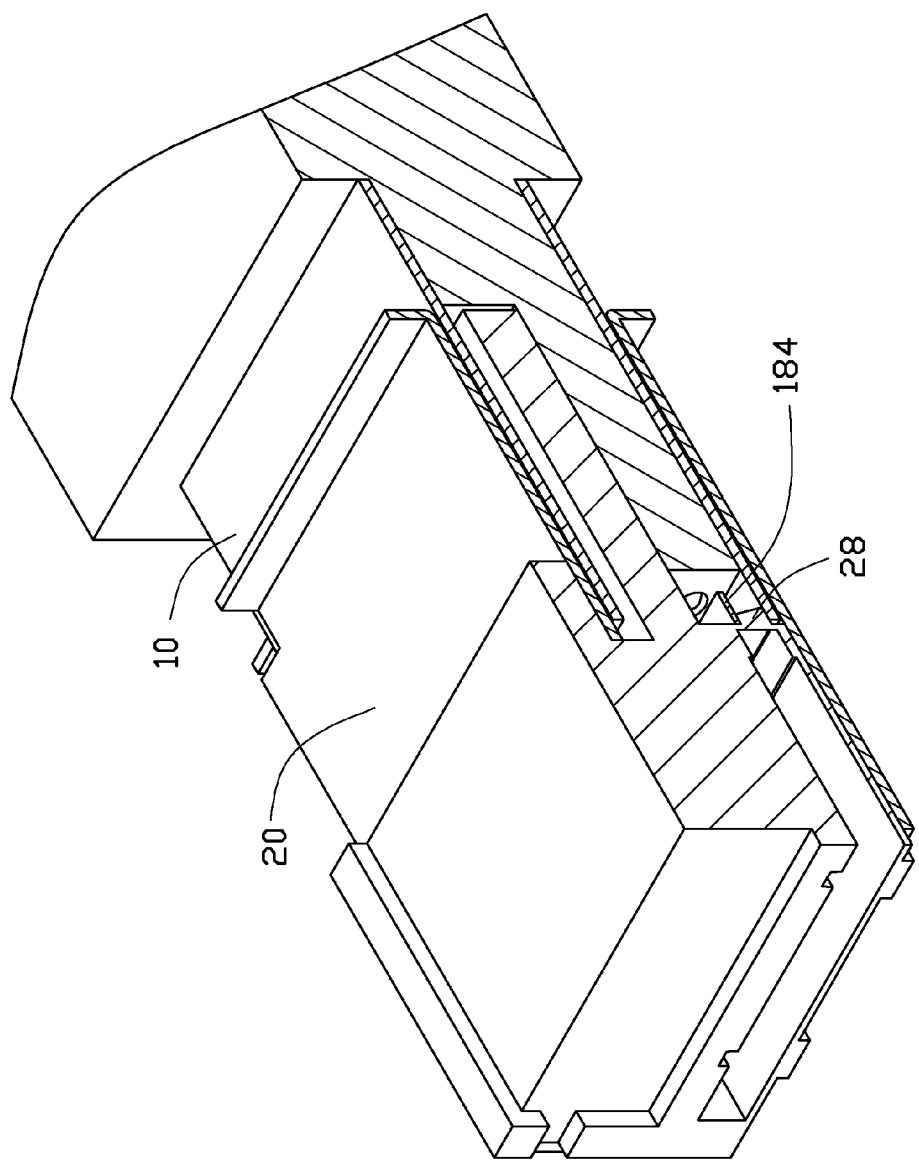
FIG. 7 is similar to FIG. 6, but showing the male optical connector coupled to the female optical connector in a second position.
Figure 8:
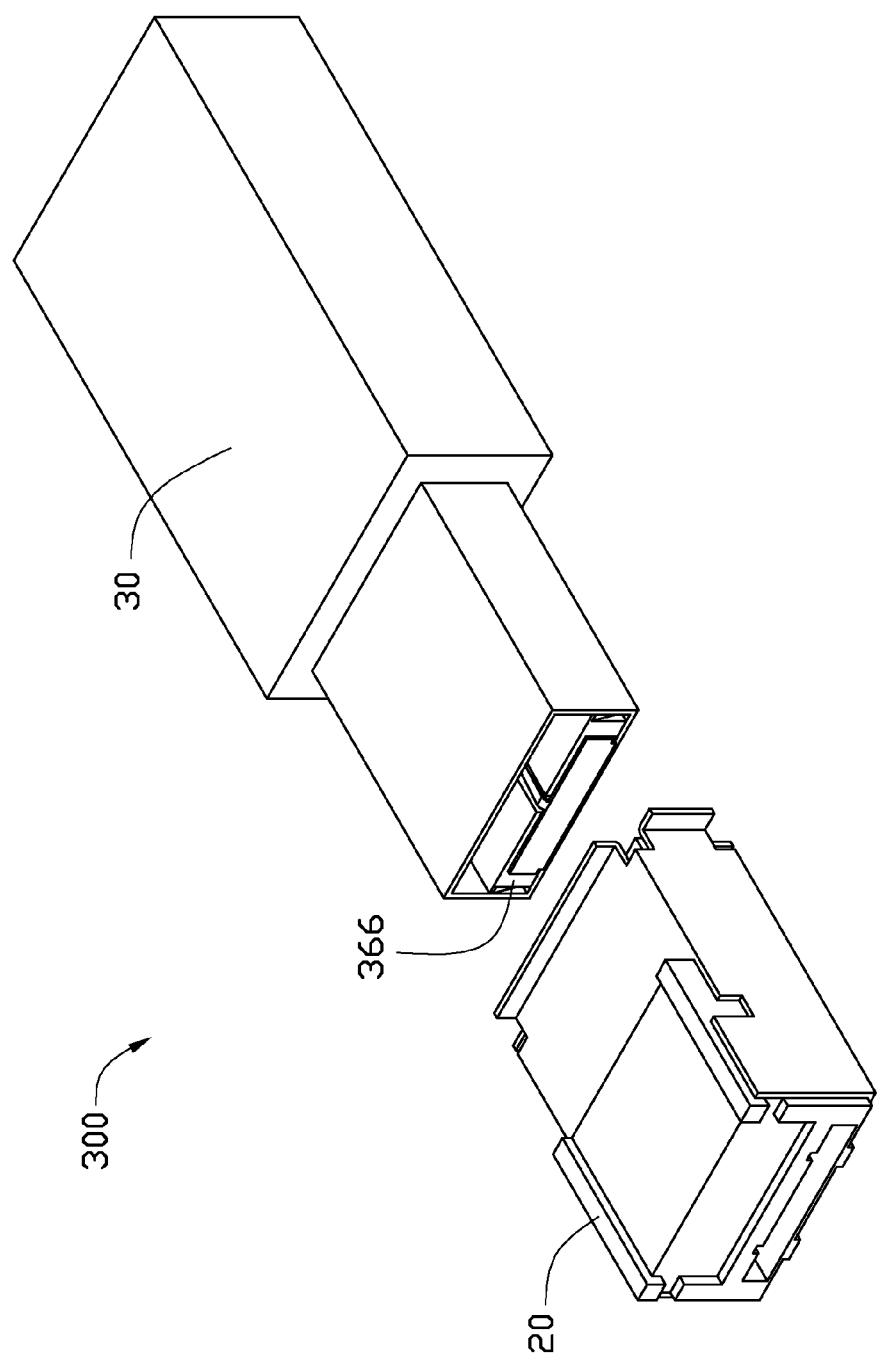
FIG. 8 is a schematic, isometric view of an optical fiber coupling assembly including a male optical connector and a female optical connector, according to a second exemplary embodiment.
Figure 9:
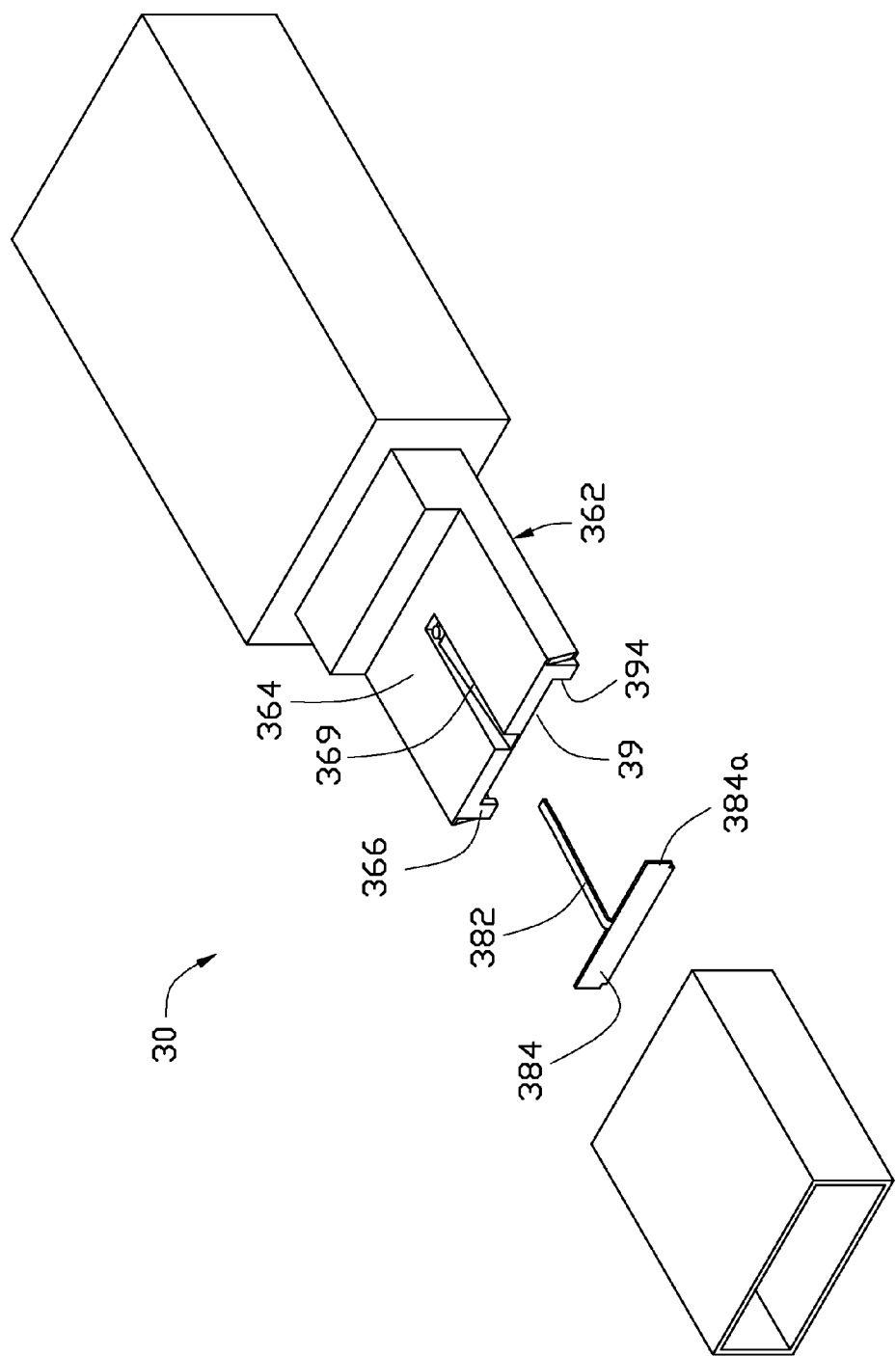
FIG. 9 is an exploded, isometric view of the male optical connector of FIG. 8.
Figure 10:
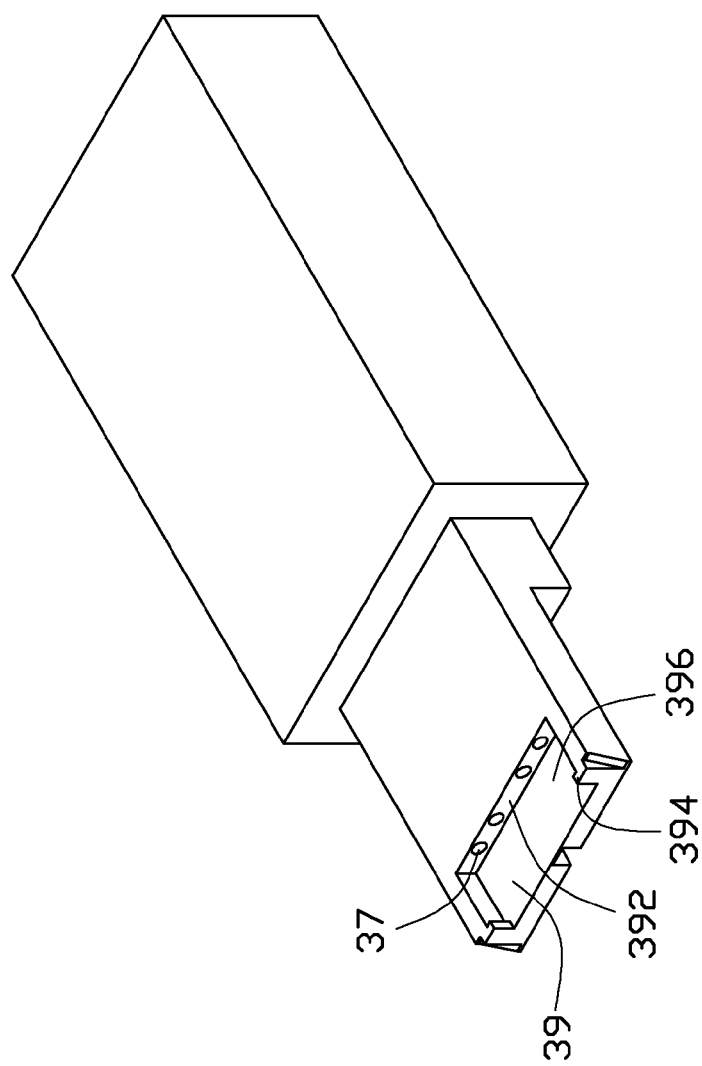
FIG. 10 is a partial, isometric view of the male optical connector of FIG. 9.
Figure 11:
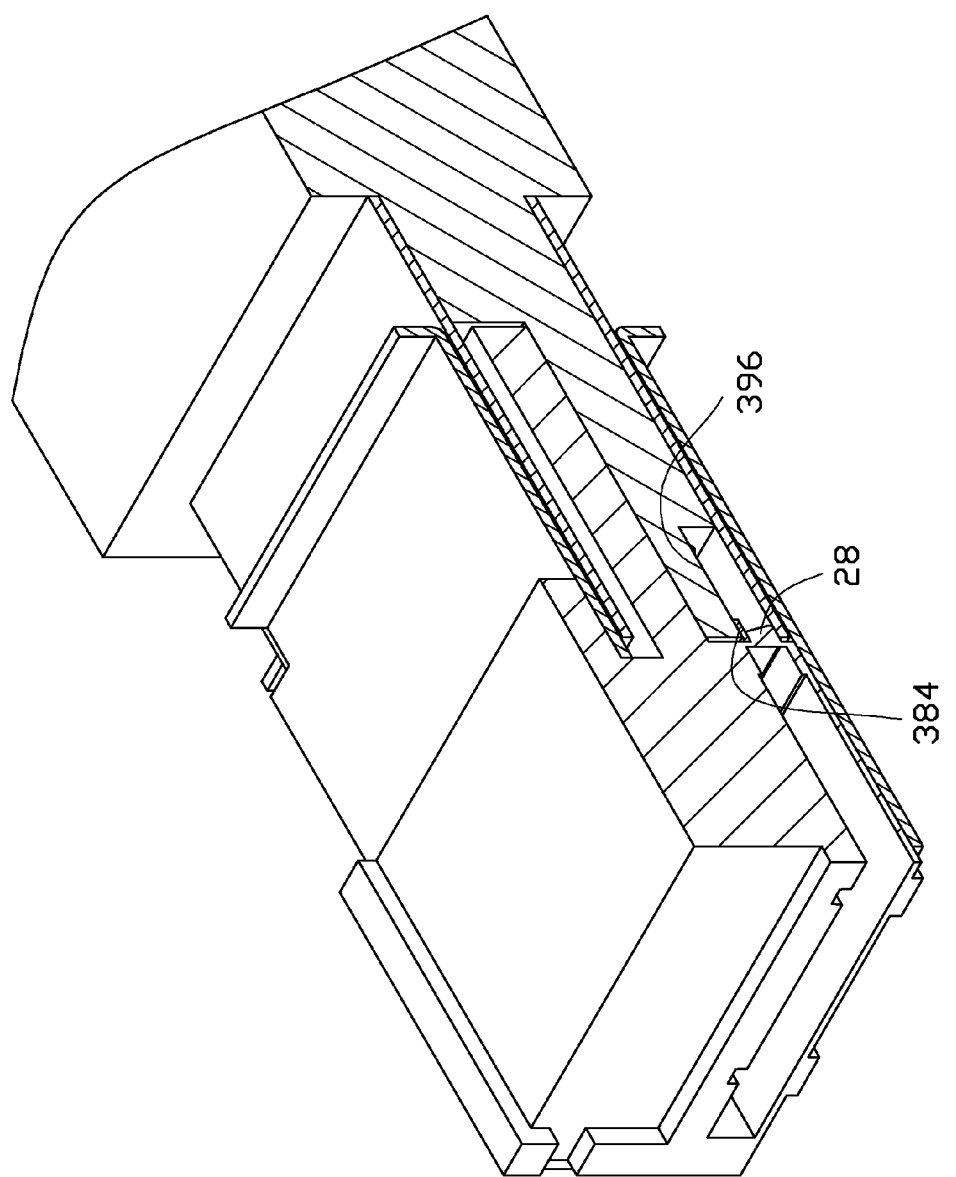
FIG. 11 is a sectional view of the optical fiber coupling assembly of FIG. 8, showing the male optical connector coupled to the female optical connector.

The cover 18 is received in the first cavity 140. The cover 18 includes an arm 182 and a blocking plate 184. The arm 182 is substantially an elongated cuboid and includes two opposite short sides 182a and two opposite long sides 182b. One end of the arm 182 defines a positioning hole 183 corresponding to the positioning post 168. The positioning post 168 extends through the positioning hole 183. The arm 182 is attached to the bottom surface 169 by adhesive. The blocking plate 184 is substantially an elongated cuboid and includes two opposite first sides 184a and two opposite second sides 184b. The first sides 184a are short sides, and the second sides 184b are long sides. Two cutouts 187 are defined on two opposite ends of the blocking plate 184 along the second sides 184b. The two cutouts 187 are symmetrically about the arm 182. One second side 184b is resiliently attached to one short side 182a. The blocking plate 184 covers the male transmitting surface 166 and is apart from the male transmitting surface 166. As a result, the blocking plate 184 can cover the lenses 17 to block dust from attaching to the lenses 17. This can ensure high transmission efficiency and signal integrity. In this embodiment, a distance C (shown in FIG. 6) between the blocking plate 184 and the male transmitting surface 166 is larger than a length d (shown in FIG. 6) of the first side 184a.

The male optical connector 10 further includes two first transmitting optical fibers (not shown) and two first receiving optical fibers (not shown). The four optical fibers are buried in the insulative base 16 and coupled to the four first lenses 17.

Figure 4:
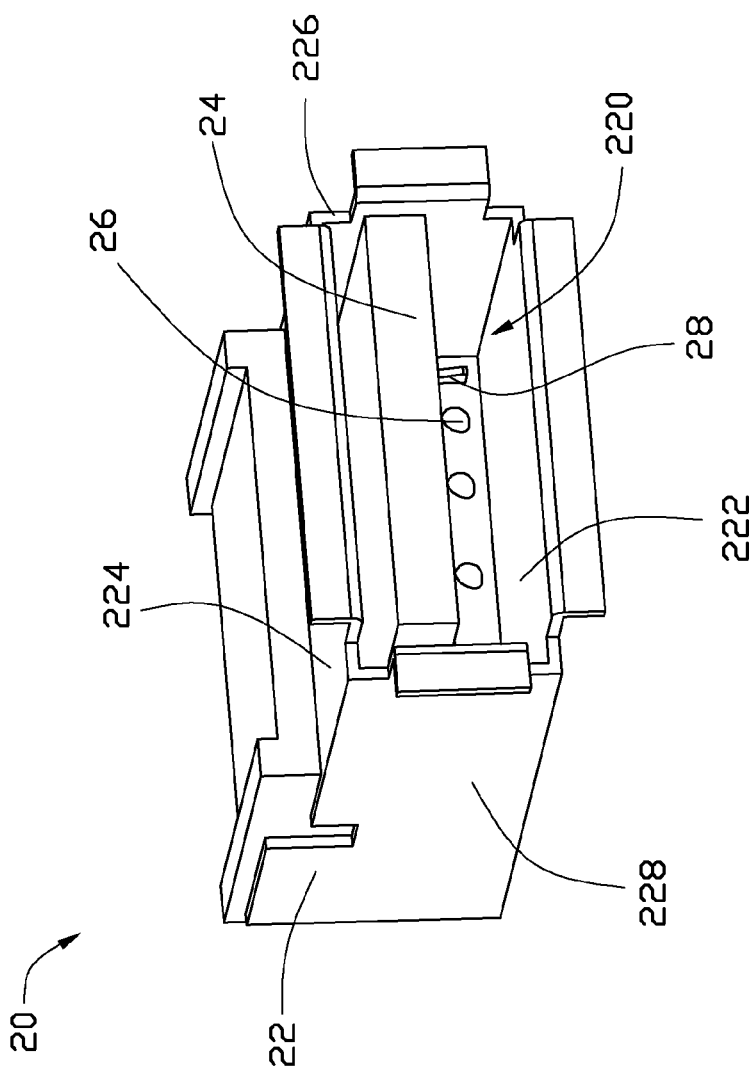
FIG. 4 is a schematic, isometric view of the female optical connector of FIG. 1.
Figure 5:
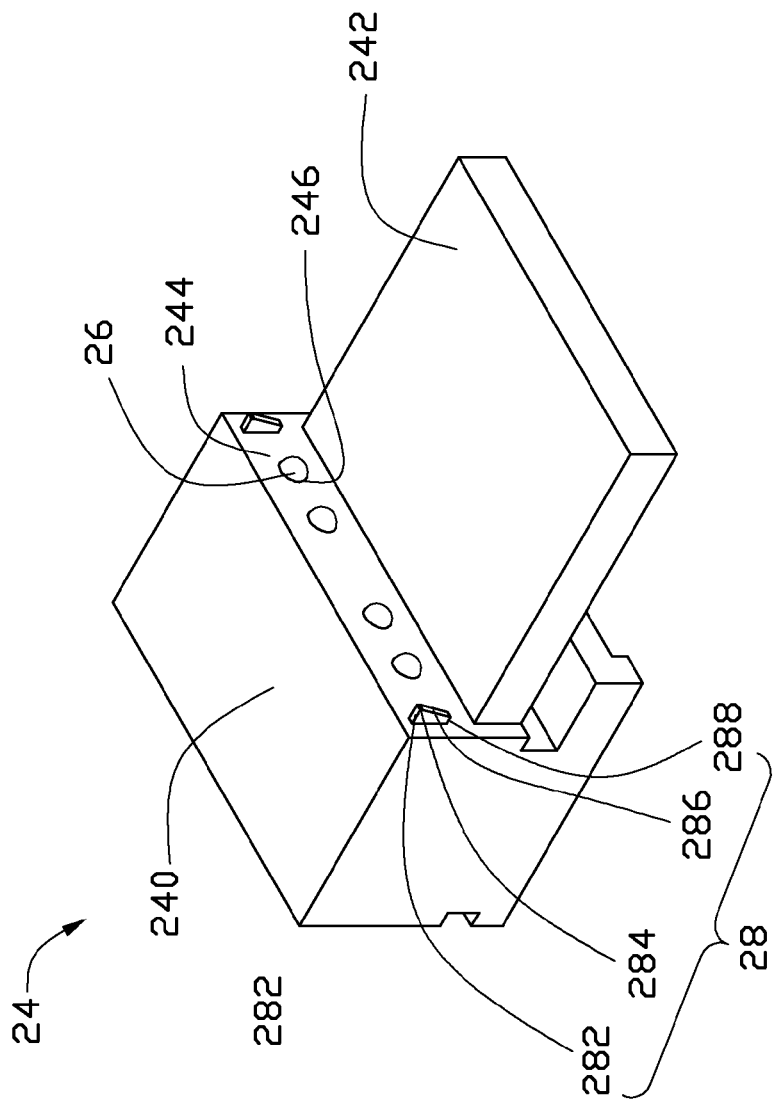
FIG. 5 is a schematic, isometric view of a supporting member of the female optical connector of FIG. 4.

Referring to FIGS. 4-5, the female optical connector 20 includes a housing 22, an insulative supporting member 24, four second lenses 26, and two pushing members 28.

The housing 22 is approximately a rectangular frame. The housing 22 may be fixed inside electronic devices. The housing 22 includes a bottom panel 222, a top panel 224, a first side panel 226, and a second side panel 228. The bottom panel 222 is parallel to the top panel 224. The first side panel 226 is parallel to the second side panel 228. The bottom panel 222, the first side panel 226, the top panel 224, and the second side panel 228 are connected to each other end-to-end to cooperatively define a second cavity 220.

The supporting member 24 is received in the second cavity 220 and includes a body portion 240 and a protruding portion 242. The body portion 240 includes a female transmitting surface 244 facing the male transmitting surface 166. Four second receiving holes 246 are defined on the female transmitting surface 244 corresponding to the four first lenses 167. The protruding portion 242 extends from the female transmitting surface 244.

The four second lenses 26 are partially received in the four second receiving holes 246 respectively.

The two pushing members 28 are formed on the female transmitting surface 244 and spaced from each other. The two pushing members 28 are positioned at two sides of the second receiving holes 246 between the bottom panel 222 and the protruding portion 242. The two pushing members 28 correspond to the two cutouts 187. Each pushing member 28 includes a supporting surface 282, an engaging surface 284, a contacting surface 286, and a blocking surface 288. The supporting surface 282 and the blocking surface 288 are substantially perpendicular to the female transmitting surface 244. The engaging surface 284 is parallel to the female transmitting surface 244 and connects the supporting surface 282. The contacting surface 286 inclines relative to the female transmitting surface 244. The contacting surface 286 connects the engaging surface 284 to the blocking surface 288. The length of the supporting surface 282 is larger than that of the blocking surface 288. When the male optical connector 10 is inserted in the female optical connector 20, the engaging surfaces 284 pass through the cutouts 187, and the contacting surfaces 286 contact the blocking plate 184.

The female optical connector 20 further includes two second transmitting optical fibers (not shown) and two second receiving optical fibers (not shown). The four optical fibers are buried in the supporting member 16 and coupled to the four second lenses 26.

Referring to FIGS. 3-7, when the male optical connector 10 is inserted into the female optical connector 20, the inserting portion 14 is received in the second cavity 220. The first sidewall 142, the third sidewall 144, the second sidewall 146, and the fourth sidewall 148 correspond to the bottom panel 222, the top panel 224, the first side panel 226, and the second side panel 228, respectively. The insulative base 16 is positioned between the bottom panel 222 and the protruding portion 242. The protruding portion 242 is positioned between the insulative base 16 and the third sidewall 144. The engaging surfaces 284 pass through the cutouts 187 and the contacting surfaces 286 contact the blocking plate 184.

When the male optical connector 10 is further inserted into the female optical connector 20, the contacting surfaces 286 pull the blocking plate 184 to bend toward the male transmitting surface 166 until the blocking surfaces 288 abut the blocking plate 184 and the first lenses 17 are exposed to the second lenses 26. Therefore, the blocking plate 184 is open. In other words, the light path between the first lenses 17 and the second lenses 26 is clear. As a result, the first lens 17 is aligned with a corresponding second lens 26. Each second receiving optical fiber is coupled to a corresponding first transmitting optical fiber through the first lens 17 and the second lens 26. Each first receiving optical fiber is coupled to a corresponding second transmitting optical fiber through the first lens 17 and the second lens 26. Therefore, optical transmittance can begin and is not influenced by the blocking plate 184.

When the male optical connector 10 is detached from the female optical connector 20, the blocking plate 184 rotates about the joint between the blocking plate 184 and the arm 182 to cover the male transmitting surface 166 as the restoration of the blocking plate 184.

In other embodiments, the pushing member 28 may have a trapezoidal cross section, a rectangular cross section, or a triangle cross section perpendicular to the female transmitting surface 244. The cutouts 187 can be omitted to prevent contamination entirely.

Referring to FIGS. 8-11, an optical fiber coupling assembly 300, according to a second exemplary embodiment, is shown. The optical fiber coupling assembly 300 includes a male optical connector 30 and the female optical connector 20. The differences between the male optical connector 30 of this embodiment and the male optical connector 10 of the first embodiment are the following: a connecting surface 366 connects the first surface 362 to the second surface 364. The connecting surface 366 defines a receiving space 39. A male transmitting surface 392 is formed on the bottom of the receiving space 39. The first lenses 37 are mounted to the male transmitting surface 392. The blocking plate 384 is positioned at the opening of the receiving space 39, and the two first sides 384a contact the two side surfaces 394 of the receiving space 39. The joint between the blocking plate 384 and the arm 382 is adjacent to the bottom surface 369. The blocking plate 384 covers the male transmitting surface 392 and is spaced from the male transmitting surface 392. The distance between the blocking plate 384 and the male transmitting surface 392 is larger than the length of the first side 384a.

When the male optical connector 30 is inserted into the female optical connector 10, the pushing members 28 pull the blocking plate 384 to bend toward the male transmitting surface 392 until the blocking plate 384 abuts the top 396 of the receiving space 39 and the first lenses 37 are exposed to the second lenses 26. As a result, the light path between the first lenses 37 and the second lenses 26 is clear.

Advantages of the optical fiber coupling assembly 300 of the second embodiment are similar to those of the optical fiber coupling assembly 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An optical fiber coupling assembly, comprising:
   a male optical connector comprising:
   an insulative base comprising a first surface, a second surface opposite to the first surface, and a male transmitting surface, the insulative base defining a slot and comprising a positioning post extending from a bottom surface in the slot;
   first lenses mounted to the insulative base and exposed at the male transmitting surface; and a cover comprising an arm and a blocking plate, one end of the arm defining a positioning hole with the positioning post extending therethrough, the other end of the arm resiliently attached to the blocking plate, the blocking plate spaced from the first lenses and configured for covering the first lenses; and a female optical connector facing the male transmitting surface, the female optical connector comprising:

an insulative supporting member comprising a female transmitting surface facing the male transmitting surface;

second lenses mounted to the female transmitting surface and spatially corresponding to the respective first lenses; and two spaced pushing members formed on the female transmitting surface for pushing and bending the blocking plate toward the first lenses;

wherein the male optical connector is inserted in the female optical connector, the blocking plate is bent by the pushing members so as to expose the first lenses to the second lenses.

2. The optical fiber coupling assembly as claimed in claim 1, wherein the male optical connector further comprises a grip and an inserting portion partially received in the grip, the inserting portion is a hollow cuboid and comprises a first sidewall, a second sidewall, a third sidewall, and a fourth sidewall, the first sidewall is parallel to the third sidewall, the second sidewall is parallel to the fourth sidewall, the first sidewall, the second sidewall, the third sidewall, and the fourth sidewall connected to each other end to end, the insulative base and the cover are received in the inserting portion, the first surface is supported by the first sidewall, the second surface faces the third sidewall.

3. The optical fiber coupling assembly as claimed in claim 2, wherein the arm is substantially an elongated cuboid and comprises two opposite short sides and two opposite long sides, the blocking plate is substantially an elongated cuboid and comprises two opposite first sides and two opposite second sides, the first sides are short sides, and the second sides are long sides, one short side of the arm is connected to the second side of the blocking plate.

4. The optical fiber coupling assembly as claimed in claim 3, wherein the distance between the blocking plate and the male transmitting surface is larger than the length of the first side.

5. The optical fiber coupling assembly as claimed in claim 4, wherein each pushing member comprises a supporting surface, an engaging surface, a contacting surface, and a blocking surface, the supporting surface and the blocking surface are perpendicular to the female transmitting surface, the engaging surface is parallel to the female transmitting surface and connects the supporting surface, the contacting surface inclines relative to the female transmitting surface, the contacting surface connects the engaging surface to the blocking surface, the length of the supporting surface is larger than that of the blocking surface.

6. The optical fiber coupling assembly as claimed in claim 5, wherein two cutouts are defined on two opposite ends of the blocking plate along the second sides of the blocking plate, the engaging surfaces pass through the cutouts, the contacting surfaces contact the blocking plate.

7. The optical fiber coupling assembly as claimed in claim 6, wherein the male transmitting surface connects the first surface to the second surface, the first lenses are mounted to the male transmitting surface, the blocking plate is apart from the male transmitting surface, the two first sides of the blocking plate contact the second sidewall and the fourth sidewall, respectively.

8. The optical fiber coupling assembly as claimed in claim 6, wherein the insulative base further comprising a connecting surface connecting the first surface to the second surface, the connecting surface defines a receiving space, the male transmitting surface is formed in a bottom of the receiving space, the first lenses are mounted to the male transmitting surface, the blocking plate is positioned at the opening of the receiving space, and the two first sides of the blocking plate contact the two sides of the receiving space, the joint between the blocking plate and the arm is adjacent to the bottom surface, the blocking plate is spaced from the male transmitting surface.

9. The optical fiber coupling assembly as claimed in claim 4, wherein each pushing member has a trapezoidal cross section, a rectangular cross section, or a triangle cross section perpendicular to the female transmitting surface.

10. A male optical connector, comprising:

an insulative base comprising a first surface, a second surface opposite to the first surface, and a male transmitting surface connecting the first surface to the second surface, the insulative base defining a slot and comprising a positioning post extending from a bottom surface in the slot;

a plurality of lenses mounted to the insulative base and exposed at the male transmitting surface;

a plurality of optical fibers optically coupled to the respective lenses; and a cover comprising an arm and a blocking plate, one end of the arm defining a positioning hole with the positioning post extending therethrough, the other end of the arm resiliently attached to the blocking plate, the blocking plate spaced from the lenses and configured for selectively covering or exposing the lenses.

11. The male optical connector as claimed in claim 10, wherein the male optical connector further comprises a grip and an inserting portion partially received in the grip, the inserting portion is a hollow cuboid and comprises a first sidewall, a second sidewall, a third sidewall, and a fourth sidewall, the first sidewall is parallel to the third sidewall, the second sidewall is parallel to the fourth sidewall, the first sidewall, the second sidewall, the third sidewall, and the fourth sidewall connected to each other end to end, the insulative base and the cover are received in the inserting portion, the first surface is supported by the first sidewall, the second surface faces the third sidewall.

12. The male optical connector as claimed in claim 11, wherein the arm is substantially an elongated cuboid and comprises two opposite short sides and two opposite long sides, the blocking plate is substantially an elongated cuboid and comprises two opposite first sides and two opposite second sides, the first sides are short sides, and the second sides are long sides, one short side of the arm is connected to the second side of the blocking plate.

13. The male optical connector as claimed in claim 12, wherein the distance between the blocking plate and the male transmitting surface is larger than the length of the first side.

14. The male optical connector as claimed in claim 13, wherein two cutouts are defined on two opposite ends of the blocking plate along the second sides of the blocking plate.

15. The male optical connector as claimed in claim 14, wherein the first lenses are mounted to the male transmitting surface, the blocking plate is apart from the male transmitting surface, the two first sides of the blocking plate contact the second sidewall and the fourth sidewall, respectively.

16. A female optical connector for coupling to a male optical connector, the male optical connector comprising first lenses and a blocking plate for covering or exposing the first lenses, the female optical connector comprising:
- an insulative supporting member comprising a female transmitting surface for facing the male optical connector;
- a plurality of second lenses mounted to the female transmitting surface;
- a plurality of optical fibers optically coupled to the respective second lenses; and
- two spaced pushing members formed on the female transmitting surface configured to push and bend the blocking plate to expose the first lenses to the second lenses, wherein each pushing member comprises a supporting surface, an engaging surface, a contacting surface, and a blocking surface, the supporting surface and the blocking surface are perpendicular to the female transmitting surface, the engaging surface is parallel to the female transmitting surface and connects the supporting surface, the contacting surface inclines relative to the female transmitting surface, the contacting surface connects the engaging surface to the blocking surface, the length of the supporting surface is larger than that of the blocking surface.

17. The female optical connector as claimed in claim 16, wherein each pushing member has a trapezoidal cross section, a rectangular cross section, or a triangle cross section perpendicular to the female transmitting surface.

* * * * *